US010184097B2

(12) United States Patent
Smith et al.

(10) Patent No.: US 10,184,097 B2
(45) Date of Patent: Jan. 22, 2019

(54) PROTECTIVE COATINGS FOR DETERSIVE AGENTS AND METHODS OF FORMING AND DETECTING THE SAME

(71) Applicant: Ecolab USA Inc., St. Paul, MN (US)

(72) Inventors: Kim R. Smith, Woodbury, MN (US); Mark P. Peterson, Prior Lake, MN (US); Keith E. Olson, Apple Valley, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 13/762,962

(22) Filed: Feb. 8, 2013

(65) Prior Publication Data

US 2014/0227790 A1 Aug. 14, 2014

(51) Int. Cl.

| | |
|---|---|
| ***G01N 21/78*** | (2006.01) |
| ***C11D 17/00*** | (2006.01) |
| ***C11D 3/02*** | (2006.01) |
| ***C11D 3/04*** | (2006.01) |
| ***C11D 7/02*** | (2006.01) |
| ***C11D 7/06*** | (2006.01) |

(52) U.S. Cl.

CPC ............ *C11D 17/0039* (2013.01); *C11D 3/02* (2013.01); *C11D 3/044* (2013.01); *C11D 7/02* (2013.01); *C11D 7/06* (2013.01)

(58) Field of Classification Search

CPC ................................ C11D 17/00; G01N 21/78

USPC ........ 436/5, 73, 79, 100, 163–164; 510/220, 510/224–225, 441, 108, 445–447

See application file for complete search history.

(56) References Cited

U.S. PATENT DOCUMENTS 2,142,870 A * 1/1939 Hall et al. .................... 510/510
2,356,443 A * 8/1944 Bissinger ...................... 510/353
2,642,347 A * 6/1953 Gilbert ........................... 48/216
2,987,483 A * 6/1961 Brooker ........................ 510/495
3,007,877 A * 11/1961 Allen ........................... 510/441
3,271,317 A * 9/1966 Otrhalek et al. .............. 510/511
3,301,636 A * 1/1967 Otrhalek ....................... 510/441
3,356,612 A * 12/1967 Guthrie ........................ 510/233
3,924,030 A * 12/1975 Tatara et al. .................. 427/213
3,989,635 A * 11/1976 Toyoda et al. ................ 510/442
4,244,693 A * 1/1981 Guon ................................ 436/5
4,569,780 A * 2/1986 Fernholz ............. A47L 15/4436 252/186.2
4,664,836 A * 5/1987 Taylor et al. ................. 510/196
4,680,134 A * 7/1987 Heile et al. .................... 510/379
4,687,121 A * 8/1987 Copeland ............ A47L 15/4436 134/93
4,690,305 A * 9/1987 Copeland ............ A47L 15/4436 222/189.06
4,725,376 A * 2/1988 Copeland ...................... 510/225
4,774,014 A * 9/1988 Kuenzel ............... C11D 17/041 206/524.5
RE32,763 E * 10/1988 Fernholtz et al. ............ 510/225
4,793,942 A * 12/1988 Lokkesmoe ......... C11D 3/2082 252/175
RE32,818 E * 1/1989 Fernholz et al. ............. 510/225
4,869,844 A * 9/1989 Johnson ........................ 510/268
5,007,958 A * 4/1991 Chung et al. ................... 75/330
5,008,029 A * 4/1991 Carmello et al. ............. 510/196
5,078,301 A * 1/1992 Gladfelter ........... A47L 15/4436 222/52
5,080,819 A * 1/1992 Morganson et al. ......... 510/225
5,198,198 A * 3/1993 Gladfelter et al. ........... 422/264
5,262,180 A * 11/1993 Orlando et al. .............. 424/700
5,316,688 A * 5/1994 Gladfelter et al. ........... 510/224
5,340,501 A * 8/1994 Steindorf ...................... 510/224
5,366,706 A * 11/1994 Perry et al. ................... 422/266
5,384,364 A * 1/1995 Besse ................. C11D 17/0039 510/108
5,474,184 A * 12/1995 Mandler ............. A47L 15/4436 206/508
5,482,641 A * 1/1996 Fleisher ............. A47L 15/4436 134/25.2
5,719,111 A * 2/1998 van den Brom ......... C11D 3/08 510/224
5,759,988 A * 6/1998 Heile et al. ................... 510/441
5,858,299 A * 1/1999 Fernholz ............ C11D 17/0073 264/122
5,902,682 A 5/1999 Bertsch-Frank et al.
6,017,864 A * 1/2000 Brittain et al. ............... 510/218
6,063,472 A * 5/2000 Takaoka et al. ................ 428/70
6,124,250 A * 9/2000 Olson et al. .................. 510/108
6,136,768 A * 10/2000 Dawson et al. .............. 510/195
6,150,324 A * 11/2000 Lentsch ................. C11D 3/044 510/222

(Continued)

FOREIGN PATENT DOCUMENTS

WO WO0078912 12/2000

*Primary Examiner* — Arlen Soderquist

(74) *Attorney, Agent, or Firm* — Merchant & Gould P.C.

(57) ABSTRACT

A method of creating a protective coating on an alkali metal hydroxide-containing solid is provided. The method includes providing carbon dioxide to an alkali metal hydroxide-containing solid and allowing the alkali metal hydroxide and carbon dioxide to react thereby forming a carbonate or bicarbonate-containing layer on the exterior of the solid wherein the carbonate or bicarbonate-containing layer is non-hygroscopic and water soluble, and wherein greater than 80% of the hydroxide in the hydroxide-containing solid does not react with the carbon dioxide, and further wherein the alkali metal hydroxide-containing solid is substantially free of lithium hydroxide. A method of testing for the presence of carbonate-containing coating on an alkali metal hydroxide containing solid is also provided. The method includes exposing the coated solid to 95 weight percent ethanol, collecting the ethanol effluent and testing the effluent for alkali metal hydroxide. A suitably coated solid does not have dissolved alkali metal hydroxide in the ethanol effluent or is substantially free of alkali metal hydroxide.

11 Claims, 2 Drawing Sheets

(56) References Cited

U.S. PATENT DOCUMENTS

| | | | | |
|---|---|---|---|---|
| 6,180,578 | B1 * | 1/2001 | Hemm et al. | 510/225 |
| 6,310,129 | B1 * | 10/2001 | Lilly et al. | 524/424 |
| 6,331,518 | B2 * | 12/2001 | Hemm et al. | 510/445 |
| 6,465,408 | B1 | 10/2002 | Lee et al. | |
| 6,800,600 | B1 * | 10/2004 | Strothoff | C11D 3/044 134/25.2 |
| 6,890,593 | B2 | 5/2005 | Tian | |
| 6,995,129 | B2 * | 2/2006 | Olson et al. | 510/379 |
| 7,041,244 | B2 * | 5/2006 | Schmiedel | 264/71 |
| 7,759,299 | B2 * | 7/2010 | Smith et al. | 510/224 |
| 7,828,905 | B2 * | 11/2010 | Smith et al. | 134/18 |
| 7,883,681 | B2 * | 2/2011 | Meade | 423/432 |
| 8,562,810 | B2 * | 10/2013 | Sanville et al. | 205/349 |
| 2001/0023239 | A1 * | 9/2001 | Lentsch et al. | 510/445 |
| 2001/0034317 | A1 * | 10/2001 | Hemm | C11D 3/044 510/445 |
| 2002/0155978 | A1 * | 10/2002 | Man et al. | 510/470 |
| 2003/0045437 | A1 * | 3/2003 | Ward | B65D 77/046 510/218 |
| 2003/0062646 | A1 * | 4/2003 | Schmiedel | 264/109 |
| 2003/0104961 | A1 * | 6/2003 | Lentsch et al. | 510/224 |
| 2004/0087459 | A1 * | 5/2004 | Lentsch et al. | 510/224 |
| 2004/0225050 | A1 * | 11/2004 | Meade | 524/425 |
| 2006/0069004 | A1 * | 3/2006 | Song et al. | 510/220 |
| 2008/0274930 | A1 * | 11/2008 | Smith et al. | 510/221 |
| 2008/0276967 | A1 * | 11/2008 | Smith et al. | 134/18 |
| 2008/0280800 | A1 * | 11/2008 | Smith et al. | 510/161 |
| 2008/0280806 | A1 * | 11/2008 | Bartelme et al. | 510/446 |
| 2008/0287338 | A1 * | 11/2008 | Wei et al. | 510/445 |
| 2009/0102085 | A1 * | 4/2009 | Stolte et al. | 264/71 |
| 2009/0105114 | A1 * | 4/2009 | Stolte | C11D 3/044 510/446 |
| 2009/0165818 | A1 * | 7/2009 | Smith et al. | 134/7 |
| 2009/0176688 | A1 * | 7/2009 | Tjelta et al. | 510/445 |
| 2010/0197545 | A1 * | 8/2010 | Silvernail | C11D 3/365 510/219 |
| 2011/0269662 | A1 * | 11/2011 | Miralles | 510/477 |
| 2012/0129751 | A1 * | 5/2012 | Miracle et al. | 510/295 |
| 2013/0026046 | A1 * | 1/2013 | Sanville et al. | 205/482 |
| 2013/0122267 | A1 * | 5/2013 | Riman et al. | 428/201 |

* cited by examiner

PROTECTIVE COATINGS FOR DETERSIVE AGENTS AND METHODS OF FORMING AND DETECTING THE SAME

FIELD

The invention relates to creating protective coatings on caustic and caustic-containing solids and the protective-coated solids. In particular, the invention relates to a chemical protective coating as compared to a protective coating provided by packaging such as plastics, polymers, and the like. Embodiments of the invention utilize an inexpensive carbon dioxide source to form the protective coatings on alkali metal hydroxide.

BACKGROUND

Sodium hydroxide-containing solids, also referred to as caustic soda, are difficult to handle because they are very hazardous when contacted with unprotected skin. Sodium hydroxide can cause severe burns with deep ulcerations and permanent scarring resulting.

Many detergents such as automatic dishwashing detergents, soaps, and drain cleaners include sodium hydroxide (caustic soda) as a component. While sodium hydroxide is an effective cleaning agent it can also pose serious health concerns when contacted with skin.

Solid or powdered sodium hydroxide is also very hygroscopic. That is, it attracts and absorbs water or humidity from the atmosphere. In humid environments such as the tropics or even many locations during the summer, sodium hydroxide-containing solids are difficult to store because they absorb water from the atmosphere. This means that powdered solids often turn into pastes or gooey agglomerates making them impossible or difficult to dispense.

In order to protect the end-user from the corrosivity of sodium hydroxide, one option is to package the caustic-containing solid in packaging such that contact with skin cannot occur. Different packages have been used. These packages include a water-soluble polymer that dissolves upon contact with water. The end-user places the polymer-encased solid in the dispenser and when exposed to water the polymer dissolves thereby exposing the encased solid for use. A drawback of polymer encasement is the expense. Another option is to encase the solid in a plastic container. However, removing the plastic may result in contact of the solid with skin. Both of the encasement options help to reduce water absorption from the atmosphere. Another option for avoiding caustic burns is for the end-user to use some sort of skin-protectant such as gloves. Gloves work well to protect the end-user except the user is not always compliant and skin contact with the caustic can result. Gloves are also not a suitable option for eliminating water absorption from the atmosphere in humid environments.

Another option for protecting the end-user from the caustic in detergents and for reducing water absorption from the atmosphere is desirable. A protectant that is inexpensive, easy to form and effective at protecting the end-user from burns and protects the caustic from humidity is sought.

SUMMARY

The invention provides a method of creating a protective coating on an alkali metal hydroxide-containing solid, including providing carbon dioxide to an alkali metal hydroxide-containing solid and allowing the alkali metal hydroxide and carbon dioxide to react with the hydroxide-containing solid's outer surface thereby forming a carbonate or bicarbonate-containing layer on the exterior of the solid wherein the carbonate or bicarbonate-containing layer is non-hygroscopic and water soluble, and wherein greater than 80% of the total hydroxide in the hydroxide-containing solid does not react with the carbon dioxide. The alkali metal hydroxide-containing solid is substantially free of lithium hydroxide.

In an embodiment the method of the invention includes sodium hydroxide or potassium hydroxide or a combination thereof as the alkali metal hydroxide. In another embodiment the carbon dioxide is provided as a gas or as solidified carbon dioxide, also commonly referred to as “dry ice.”

The invention further provides a method of creating a protective coating on a solid, including providing a solid consisting of alkali metal hydroxide, sodium silicate, alkaline silicate, or a combination thereof; treating the solid with carbon dioxide whereby a protective coating is created on the exterior of the solid, and the protective coating is non-hygroscopic and water soluble, and wherein less than 20 wt-% of the total hydroxide in the hydroxide-containing solid reacts with the carbon dioxide.

A solid composition is further provided by the invention. The solid composition includes an exterior laminate of a water-soluble, non-hygroscopic protective coating selected from the group consisting of alkali metal bicarbonate or alkali metal carbonate or a combination thereof; the laminate surrounding an inner solid core includes hygroscopic alkali metal hydroxide or alkali metal carbonate or a combination thereof. In an embodiment the weight ratio of alkali metal hydroxide in the inner core to the alkali metal bicarbonate or alkali metal carbonate in the laminate is at least 4 parts hydroxide-containing compound: 5 parts carbonate or bicarbonate compound.

In yet another embodiment the invention provides a method of making a solid detergent composition including the steps of combining an alkali metal hydroxide or alkali, surfactant, sequestrant, and solidification agent to form a combination; allowing the combination to solidify; treating the solid combination with gaseous carbon dioxide such that a carbonate-containing coating or bicarbonate-containing coating forms on the surface of the solid. The combination may further include at least one of a rinse aid, bleaching agent, anti-microbial agent, bleaching agent activator; detergent builder or filler; defoaming agent, anti-redeposition agent, optical brightener, dye, or fragrance or any combination thereof.

In an embodiment of the invention, the detergent composition is combined in an extruder. In another embodiment the combination is combined and poured into a mold before being allowed to solidify. If the solid is formed in a mold, the solid is removed from the mold before carbon dioxide treatment.

A method of determining the coating quality of the carbonate coating is also provided. The method includes exposing the carbonate coated solid to ethanol and testing for solubilization of the caustic in the ethanol effluent. Since carbonate is not soluble in ethanol, a well-coated carbonate-coated solid will not have sodium hydroxide or potassium hydroxide present in the effluent.

DESCRIPTION

Figure 1:
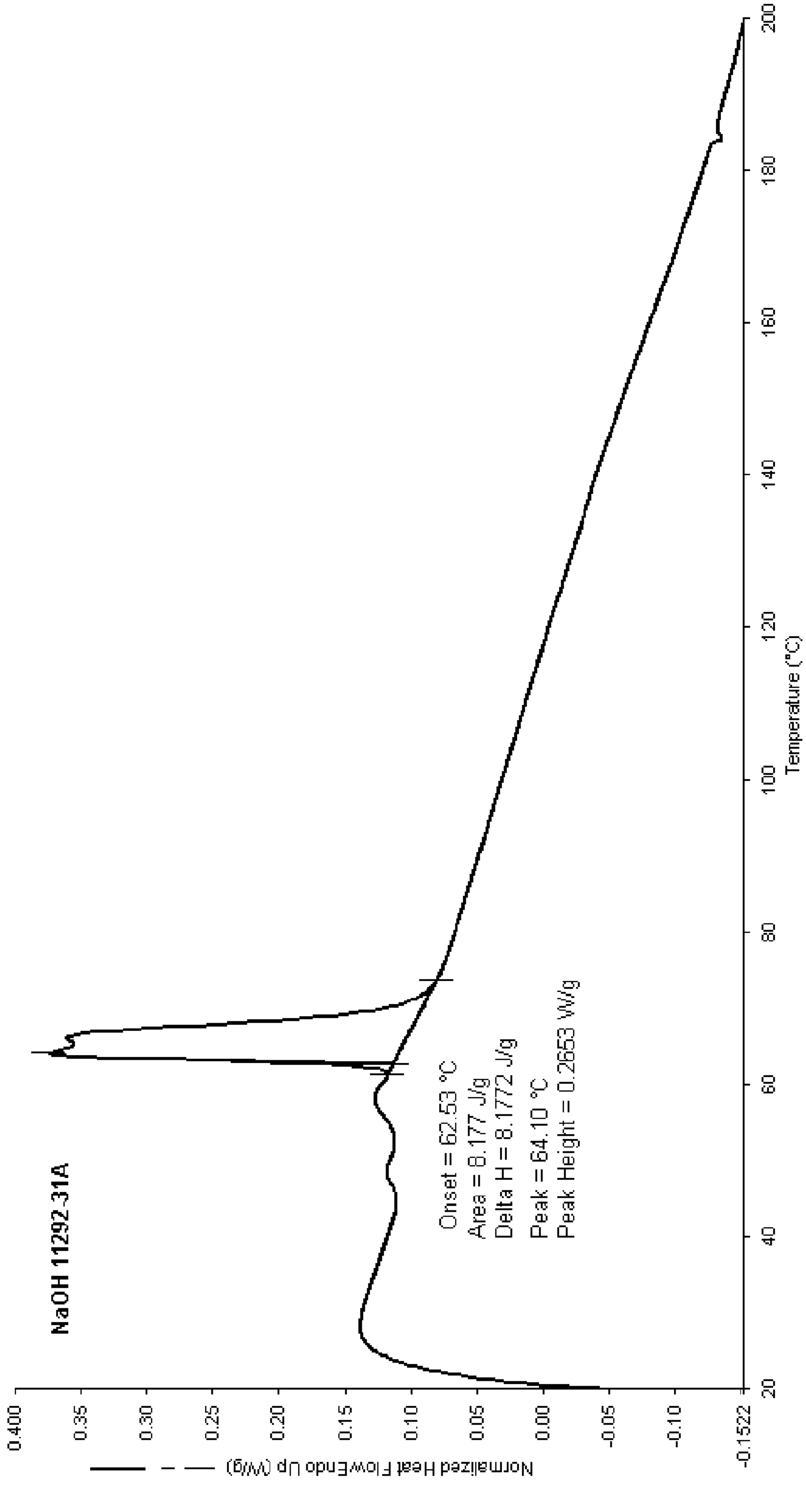
FIG. 1 is a graph of Differential Scanning Calorimetry (DSC) of sodium hydroxide beads before treatment with carbon dioxide.

For the following defined terms, these definitions shall be applied, unless a different definition is given in the claims or elsewhere in this specification.

The term "substantially free" may refer to any component that the composition of the invention lacks or mostly lacks. When referring to "substantially free" it is intended that the component is not intentionally added to compositions of the invention. Use of the term "substantially free" of a component allows for trace amounts of that component to be included in compositions of the invention because they are present in another component. However, it is recognized that only trace or de minimus amounts of a component will be allowed when the composition is said to be "substantially free" of that component. It is understood that if an ingredient is not expressly included herein or its possible inclusion is not stated herein, the invention composition may be substantially free of that ingredient. Likewise, the express inclusion of an ingredient allows for its express exclusion thereby allowing a composition to be substantially free of that expressly stated ingredient.

The term "solid" as used herein refers to powders, granules, extruded or molded or pressed pellet or tablet materials having a weight of 50 grams up through 250 grams, an extruded, pressed or molded solid with a weight of about 100 grams or greater or a solid block having a mass between about 1 and 50 kilograms.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Weight percent, percent by weight, % by weight, and the like are synonyms that refer to the concentration of a substance as the weight of that substance divided by the weight of the composition and multiplied by 100.

Unless otherwise stated, all weight percentages provided herein reflect the active weight percent of each component. The weight percent of raw material as provided by the manufacturer is easily determined from the provided information by use of product data sheets as provided from the manufacturer.

As used herein the term, "consisting essentially of" in reference to a composition refers to the listed ingredients and does not include additional ingredients that, if present, would affect the composition. The term "consisting essentially of" may also refer to a component of the composition. As used herein the term "consisting essentially of" in reference to a method of preparing a protective coating refers to the listed steps and does not include additional steps (or ingredients if a composition is included in the method) that, if present, would substantially affect the method.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. More preferably, the amount of phosphate is less than 0.1 wt %, and most preferably, the amount of phosphate is less than 0.01 wt %.

As used herein, the term "phosphorous-free" refers to a composition, mixture, or ingredient that does not contain a phosphorous or phosphorous-containing compound or to which a phosphorous or phosphorous-containing compound has not been added. Should a phosphorous or phosphorous-containing compound be present through contamination of a phosphorous-free composition, mixture, or ingredients, the amount of phosphorous shall be less than 0.5 wt %. More preferably, the amount of phosphorous is less than 0.1 wt %, and most preferably, the amount of phosphorous is less than 0.01 wt %.

In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

It has surprisingly been found that a hygroscopic protective layer can be formed on alkali metal hydroxide solids and alkali metal hydroxide containing solids using carbon dioxide gas. A sodium carbonate shell is formed when carbon dioxide contacts the sodium hydroxide. The sodium carbonate is less reactive to skin than the sodium hydroxide and thereby provides a coating suitable for handling with unprotected skin.

The protective coating is a shell or laminate on the exterior surface of the caustic-containing solid. Because the reaction of carbon dioxide with the sodium hydroxide is a self-limiting reaction, the entire amount of sodium hydroxide is not converted to sodium carbonate. That is, only the exposed sodium hydroxide is available to react with the carbon dioxide. Since the sodium carbonate is created on the exterior surface of the solid, the sodium carbonate protective coating comprises less than 20 weight percent of the solid because it does not permeate the surface. In an embodiment the sodium carbonate protective coating comprises less than 15 weight percent of the solid, less than 10 weight percent of the solid, and less than 5 weight percent of the solid. The weight ratio of a treated solid according to the method of the invention includes 1:5 parts sodium carbonate or sodium bicarbonate to sodium hydroxide up to 1:20 parts sodium carbonate or sodium bicarbonate to sodium hydroxide depending upon the size of the sodium hydroxide. One skilled in the art will appreciate if the sodium hydroxide solid is relatively large, forming a crust or laminate of sodium carbonate or sodium bicarbonate on the exterior surface may result in a small amount by weight of sodium carbonate or sodium bicarbonate as compared to the amount by weight of the sodium hydroxide. Likewise, if the surface of the sodium hydroxide is uneven or undulating, that may result in a greater amount by weight of sodium carbonate or sodium bicarbonate formed on the surface of the sodium hydroxide.

Due to the limited amount of sodium hydroxide that is converted to sodium carbonate upon exposure to carbon dioxide, the performance of the sodium-hydroxide containing composition is not affected by creating the protective coating. This is an advantageous feature of the invention. The coating does not affect, either positively or negatively, the cleaning ability of the composition it protects.

For purposes of the invention, either gaseous or solid carbon dioxide may be used to form the protective coating on the solid. In an embodiment of the invention a carbon dioxide rich atmosphere is created by piping carbon dioxide gas into a chamber or confined area. By carbon-dioxide rich atmosphere it is intended that more carbon dioxide is present than other gases. That is, carbon dioxide comprises the majority of the atmosphere, more than nitrogen, oxygen, neon, methane, helium, hydrogen, xenon, and inert gases such as argon, combined. In an embodiment carbon dioxide comprises at least 60% of the atmosphere, at least 70 percent of the atmosphere, at least 80% of the atmosphere, at least 90% of the atmosphere, at least 95 percent of the atmosphere. The skilled artisan will recognize that the rate of producing the protective coating is directly dependent upon the amount of carbon dioxide to which the caustic-containing solid is exposed. That is, if the carbon dioxide atmosphere is comprised of 50 percent carbon dioxide the protective coating will form more slowly than if the atmosphere is comprised of 100 percent carbon dioxide gas.

When solid carbon dioxide is used in the method of the invention, the dry ice (solid carbon dioxide) may be combined directly with the alkali metal hydroxide containing composition under ambient conditions or between about 25 and 90 degrees F. As one skilled in the art can appreciate, under these conditions the dry ice will immediately begin to sublime resulting in gaseous carbon dioxide.

In order to create the protective coating on the surface of the solid, the sodium hydroxide-containing solid is placed in a carbon dioxide rich atmosphere and left until the protective coating is formed. The length of time necessary to form the sodium carbonate protective coating is less than 5 minutes, less than 4 minutes, less than 3 minutes, less than 2 minutes, less than 1 minute, less than 0.5 minutes, less than 0.25 minutes, less than 0.1 minute, and less than 0.01 minute. In another embodiment the time required to form the protective coating is less than 5 seconds, less than 3 seconds, less than 2 seconds, and less than 1 second.

In order to produce a laminate covering the entire surface of the sodium hydroxide-containing solid, the solid may have to be exposed to carbon dioxide, rotated, and treated again. The invention includes as many rotations or movements of the sodium hydroxide-containing solid as necessary to ensure that the solid is completely encased in the sodium carbonate or sodium bicarbonate. In the case of small solids, such as beads, the invention may successfully be practiced by dropping or accelerating the sodium hydroxide solid through the carbon dioxide rich atmosphere. In practicing the method of the invention in this manner, the entire surface of the solid is exposed to carbon dioxide simultaneously and there is no risk of masking a portion of the surface resulting in an unreacted portion of the surface.

Deleterious effects do not occur if the treated solid composition is allowed to remain in the carbon dioxide rich atmosphere beyond the time needed for the hydroxide to convert to carbonate or bicarbonate. Since the reaction is self-limiting, that is, only the exposed surface reacts with the carbon dioxide, it is not necessary to remove the solid from the atmosphere in any amount of time. However, for manufacturing purposes one can appreciate that throughput is important so the smallest amount of time necessary to treat the surface with carbon dioxide is desired.

The protective coating formed on the surface of the caustic-containing solid is either carbonate or bicarbonate depending upon the amount carbon dioxide is present in the atmosphere when practicing the method of the invention. Either a carbonate or bicarbonate protective coating is useful when creating protective coatings of the invention. The protective coatings of the invention, whether carbonate or bicarbonate, may be referred to as encapsulating the caustic-containing solid composition.

The invention uses a water soluble caustic such as sodium hydroxide in order to form the protective coating on the exterior surface of the solid. The invention is not practiced using water insoluble caustic compounds such as MgOH and CaOH. The invention is also not practiced using lithium hydroxide.

The protective coating formed using the method of the invention remains until it is dissolved in water. An aspect of the invention includes that the coating is hygroscopic and capable of dissolving in water. This aspect is helpful given the uses for caustic or sodium-hydroxide-containing solids generally include water. The uses, as addressed above, include but are not limited to washing objects such as dishes in an automatic dishwasher or cleaning objects such as cleaning drains. Therefore, the protective coating of the invention does not require an additional dissolving step before use because the use of the solid generally requires water which also dissolves the protective coating.

Sodium carbonate or sodium bicarbonate encrusted sodium hydroxide-containing solids prepared according to the method of the invention may be useful in preparing cleaning compositions. Such cleaning compositions include but are not limited to automatic dishwashing detergents, laundry detergents, drain cleaners, and degreasers. In addition to the protective-coated caustic solid of the invention, cleaning compositions may include one or more surfactants, water conditioning or sequestering agents, dyes, perfumes, hydrotropes, anti-corrosion agents, bleaching agents, enzymes, anti-redeposition agents, defoaming agents, hardening agents, and the like.

A "solid" according to the present disclosure encompasses a variety of cast or extruded forms including, for example, pellets, blocks, tablets, particulates and powders. It should be understood that the term "solid" refers to the state of the composition under the expected conditions of storage and use of the solid composition. In general, it is expected that the composition will remain a solid when provided at a temperature of up to about 100° F. and preferably greater than 120° F.

In certain embodiments, the solid composition treated according to the present invention is provided in the form of a unit dose. A unit dose refers to a solid unit sized so that the entire unit is used during a single washing cycle. When the solid composition is provided as a unit dose, it is preferably provided as a cast solid, an extruded pellet, or a tablet having a size of between about 1 gram and about 50 grams. In other embodiments, a cast solid, an extruded pellet, or a tablet having a size of between 50 grams up through 250 grams, or an extruded solid with a weight of about 100 grams or greater. Furthermore, it should be appreciated that the solid composition can be provided as a cast solid, an extruded pellet, or a tablet so that a plurality of the solids will be available in a package having a size of between about 40 grams and about 11,000 grams.

In other embodiments, the solid composition is provided in the form of a multiple-use solid, such as, a block or a plurality of pellets, and can be repeatedly used to generate aqueous detergent compositions for multiple washing cycles. In certain embodiments, the solid detergent composition is provided as a cast solid, an extruded block, or a tablet having a mass of between about 5 grams and 50 kilograms. In certain embodiments, a multiple-use form of the solid detergent composition has a mass between about 1 and 10 kilograms. In further embodiments, a multiple-use form of the solid detergent composition has a mass of between about 5 kilograms and about 8 kilograms. In other embodiments, a multiple-use form of the solid detergent composition has a mass of between about 5 grams and about 1 kilogram, or between about 5 grams and about 500 grams.

A nonlimiting example of a detergent composition upon which the present invention may be practiced includes the following. Such a composition is suitable for preparing cast solid detergents, include warewashing detergents.

| Ingredient | Percent by Weight | Percent by Weight | Percent by Weight |
|---|---|---|---|
| Alkali metal hydroxide | 5-65 | 10-50 | 15-45 |
| Chelant/water conditioner | 0-30 | 1-25 | 5-20 |
| Surfactant | 0-30 | 1-25 | 5-20 |
| Water | 5-25 | 5-20 | 5-15 |

Once the above composition is cast into a solid, it is removed from the mold. The cast solid is then treated with carbon dioxide according to the method of the invention to form the carbonate protective laminate on the surface of the detergent.

Another nonlimiting example of a detergent composition upon which the present invention may be practiced includes the following. Such a composition is suitable for extrusion.

| Ingredient | Percent by Weight | Percent by Weight | Percent by Weight |
|---|---|---|---|
| Alkali metal hydroxide | 5-65 | 10-65 | 15-65 |
| Chelant/water conditioner | 0-30 | 1-25 | 5-20 |
| Surfactant | 0-10 | 1-8 | 1-5 |
| Water | 5-15 | 5-13 | 5-11 |
| Binder | 0-10 | 1-10 | 2-10 |

Once the above composition is extruded the solid may be treated according to the present invention. The extruded solid would then be treated with carbon dioxide according to the method of the invention to form the carbonate protective laminate on the surface of the detergent.

Yet another nonlimiting example of a detergent composition upon which the present invention may be practiced includes the following. Such a detergent composition is suitable for preparing pressed solids.

| Ingredient | Percent by Weight | Percent by Weight | Percent by Weight |
|---|---|---|---|
| Alkali metal hydroxide | 1-99 | 5-90 | 10-85 |
| Chelant/water conditioner | 0-30 | 1-25 | 5-20 |
| Surfactant | 0-10 | 1-8 | 1-5 |
| Water | 2-10 | 2-8 | 2-7 |
| Binder | 0-10 | 1-10 | 2-10 |

In preparing the above composition, it is combined and then pressed into a solid block, pellet or tablet using any method known in the art. The pressed solid may then be treated according to the present invention. The pressed solid would be treated with carbon dioxide according to the method of the invention to form the carbonate protective laminate on the surface of the detergent. As a skilled artisan will appreciate, the resulting solid detergent will not have a continuous laminate on the surface if the coated NaOH is dispersed within the product.

The invention further provides a method of incorporating sodium hydroxide or other alkali metal hydroxides into solid compositions. If one is able to provide sodium hydroxide in a way that it does not compete for free water, it provides opportunities for new combinations and new methods of combining and preparing modifications of existing combinations such as detergents. Presently, sodium hydroxide is difficult to include in extruded solids because of the corrosive nature of the component on the expensive extrusion equipment. However, if the sodium hydroxide is inexpensively encased in a protective coating such that it will not corrode equipment, many new compositions may be formed using corrosive-sensitive equipment such as extruders. Further, the reactivity of NaOH with other components in the finished good, either during processing or as the finished detergent sits in the hours/days/weeks after manufacture becomes a nonissue.

The next nonlimiting examples of detergent formulations are prepared using a pre-protected alkali hydroxide component. As discussed above, pretreating or coating the alkali metal hydroxide with carbon dioxide before incorporating it into a solid provides greater flexibility when formulating compositions. In short, the carbonate coated alkali metal hydroxide is protected from reacting with handling equipment and from other formula components.

The first formulation provided in the table below provides a detergent composition such as a warewashing composition or the like suitable for extrusion.

| Ingredient | Percent by Weight | Percent by Weight | Percent by Weight |
|---|---|---|---|
| Alkali metal hydroxide (carbonate-coated) | 1-65 | 5-60 | 10-60 |
| Chelant/water conditioner | 0-30 | 1-25 | 5-20 |
| Surfactant | 0-10 | 1-8 | 1-5 |
| Water | 5-15 | 5-12 | 5-10 |
| Binder | 0-10 | 1-10 | 2-10 |

Unlike the earlier provided extruded formulation, the detergent incorporating the pre-treated alkali metal hydroxide does not require treatment according to the invention after extrusion has occurred because such method was practiced on the alkali metal hydroxide before it was incorporated into the formulation.

The formulation provided in the table below provides an detergent composition incorporating a pre-protected alkali metal hydroxide ingredient into a composition such as a warewashing composition or the like suitable for preparing pressed solids.

| Ingredient | Percent by Weight | Percent by Weight | Percent by Weight |
|---|---|---|---|
| Alkali metal hydroxide (carbonate-coated) | 1-65 | 5-60 | 10-60 |

-continued

| Ingredient | Percent by Weight | Percent by Weight | Percent by Weight |
|---|---|---|---|
| Chelant/water conditioner | 0-30 | 1-25 | 5-20 |
| Surfactant | 0-10 | 1-8 | 1-5 |
| Water | 5-15 | 5-12 | 5-10 |
| Binder | 0-10 | 1-10 | 2-10 |

Unlike the earlier-provided pressed solid formulation, the detergent incorporating the pre-treated alkali metal hydroxide does not require treatment according to the invention after pressing has occurred because such method was practiced on the alkali metal hydroxide before it was incorporated into the formulation.

United States Patent Publications 2009-0105114, 2009-0102085, and 2009-0105111 address methods of preparing solid detergent compositions via pressing. The content of each publication is herein incorporated by reference in its entirety for all purposes.

Any of the above-provided formulations may optionally include any or all of the following: a rinse aid, bleaching agent, anti-microbial agent, bleaching agent activator; detergent builder or filler; defoaming agent; corrosion inhibitor; anti-redeposition agent; optical brightener; dye; or fragrance or any combination thereof.

A method of assessing the coating quality of the carbonate coating on the alkali metal hydroxide or the alkali metal hydroxide-containing solid is provided. Since alkali metal hydroxides such as sodium hydroxide or potassium hydroxide are soluble in 95 weight percent ethanol whereas carbonate is not soluble in ethanol, ethanol provides a perfect diluent for testing the efficacy of the method of the invention.

A carbonate-coated solid sample may be provided and placed into a dissolution test unit and run at a specified flow rate with ethanol, the preferred diluent. The resultant effluent is collected and tested at intervals for detection of sodium hydroxide or potassium hydroxide as the case may be. If the carbonate coating is uniform and intact, titration values measured at the specified intervals will be under a certain concentration.

The present invention can be better understood with reference to the following examples. These examples are intended to be representative of specific embodiments of the invention, and are not intended as limiting the scope of the invention.

EXAMPLES

The following examples demonstrate that treating sodium hydroxide solids and sodium hydroxide-containing solids with carbon dioxide results in a protective coating of sodium carbonate on the exterior surface of the solid.

Example 1

Figure 2:
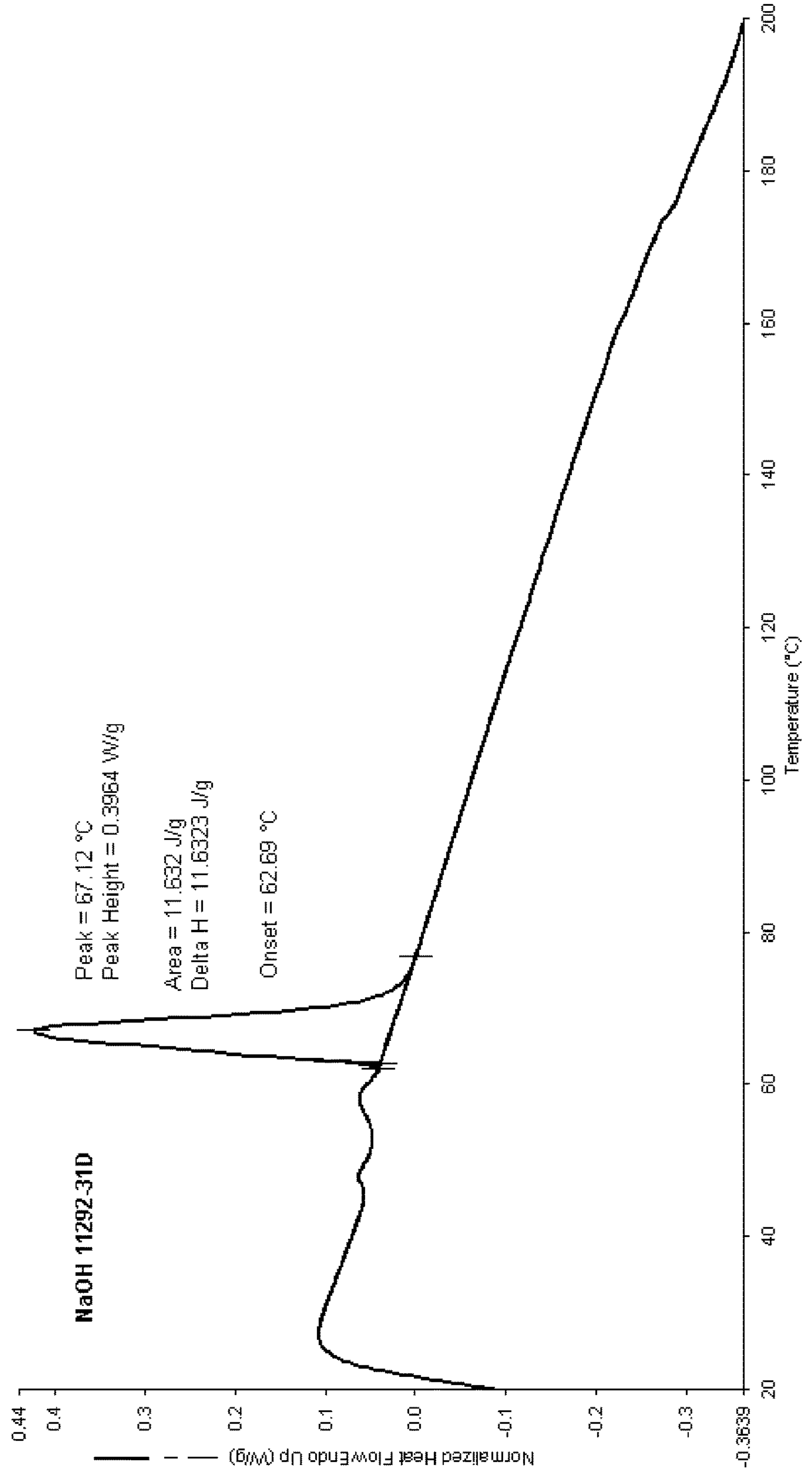
FIG. 2 is a graph of Differential Scanning Calorimetry (DSC) of sodium hydroxide beads after treatment with carbon dioxide.

Beads of sodium hydroxide were dropped through a carbon dioxide-rich atmosphere. Carbon dioxide gas was fed into a plastic tube through which the sodium hydroxide bead solids were dropped. Differential scanning calorimetry (DSC) was conducted on the beads before and after carbon dioxide treatment. The graphs showing the before and after DSC scans are provided as FIGS. 1 and 2. FIG. 1 shows a graph of the DSC scan of an untreated bead of sodium hydroxide. FIG. 2 shows a graph of the DSC scan of a carbon dioxide treated bead of sodium hydroxide. The scans show a change in the shape of the melting point peak after treatment and an increase in melting point of the bead by 5 degrees Celsius after carbon dioxide treatment.

A scanning electron microscope (SEM) was also taken of the beads before and after treatment with carbon dioxide. The SEM showed the formation of a granular coating over the carbon dioxide treated bead of sodium hydroxide thereby confirming formation of a protective coating.

Example 2

Beads of sodium hydroxide (anhydrous) were dropped through the carbon dioxide-rich atmosphere described in Example 1. After dropping or treating the sodium hydroxide with carbon dioxide the beads were no longer corrosive to skin. This non-corrosiveness confirms the presence of a protective coating on the bead.

Example 3

A solid sodium hydroxide-containing automatic dishwashing detergent commercially available as Solid Gold 2™ from Ecolab, Inc. located in St. Paul, Minn. was exposed to a carbon dioxide rich atmosphere. Solid Gold 2 detergent contains 50 percent by weight sodium hydroxide. The solid detergent was placed on a surface and the exposed surfaces were treated with carbon dioxide gas. The detergent was then inverted allowing the previously unexposed surface to be exposed to the carbon dioxide atmosphere. The treated detergent solid was no longer corrosive to skin after treatment with the carbon dioxide gas. This Example demonstrates that a protective coating was formed on the surface of the sodium hydroxide-containing detergent.

Example 4

Solid sodium hydroxide was placed in a ribbon blender. Gaseous carbon dioxide was fed into the ribbon blender along with the solid caustic. The ribbon blender was turned on to combine the caustic and the carbon dioxide. A lot of heat was generated by the combination. The resultant solid was removed from the ribbon blender. The solid caustic was now coated with a layer of sodium carbonate rendering it non-corrosive to skin.

The invention has been described with reference to various specific and preferred embodiments and techniques. However, it should be understood that many variations and modifications may be made while remaining within the spirit and scope of the invention.

We claim:

1. A method of creating a protective coating on an alkali metal hydroxide-containing solid block, comprising:

preparing a detergent composition mixture comprising at least 15 wt-% alkali metal hydroxide selected from sodium hydroxide, potassium hydroxide, or a combination thereof;

forming the detergent composition mixture into a solid block having an exterior surface and a weight of at least 1 kilogram;

applying a carbon dioxide atmosphere comprising at least 60% carbon dioxide to the exterior surface of the solid block and allowing an outermost layer of the alkali metal hydroxide and carbon dioxide to react until up to 20% of the alkali metal hydroxide has reacted; and rotating the solid block at least once to allow the carbon dioxide to react with the alkali metal hydroxide until a water-soluble carbonate-containing layer forms on all sides of the exterior surface of the solid block.

2. The method of claim 1 wherein the solid block is a multiple-use cast solid having a weight of between about 1 and 50 kilograms and wherein the cast solid is removed from a mold before the carbon dioxide atmosphere is applied to the solid block.

3. The method of claim 1, wherein the carbon dioxide is gaseous or solid.

4. The method of claim 1, wherein the resulting solid block comprises:

an inner core comprising at least 10 wt-% hygroscopic sodium hydroxide, the inner core being substantially free of sodium carbonate and sodium bicarbonate; and an exterior laminate of a water-soluble, non-hygroscopic protective coating selected from the group consisting of sodium bicarbonate or sodium carbonate or a combination thereof, the exterior laminate surrounding the inner core.

5. The method of claim 4, wherein the weight ratio of sodium hydroxide in the inner core to the sodium bicarbonate or sodium carbonate in the laminate is at least 4 parts sodium hydroxide: 1 part sodium bicarbonate or sodium carbonate.

6. The method of claim 1, wherein the detergent composition mixture comprises from 50 to 85 wt-% sodium hydroxide.

7. A method of making a solid detergent composition, comprising:

(a) combining from 5 to 65 wt-% alkali metal hydroxide, surfactant, sequestrant, and solidification agent to form a combination, wherein the combination is substantially free of carbonates and bicarbonates;

(b) allowing the combination to solidify to form a solid having a weight of at least 1 kilogram and comprising a core and an exterior portion completely encasing the core; and (c) treating the solid with gaseous or solid carbon dioxide and rotating the solid at least once such that a carbonate-containing coating or bicarbonate-containing coating forms on the exterior portion of the solid containing the alkali metal hydroxide, wherein the coating and any remaining alkali metal hydroxide are at a weight ratio of 1part of coating to every 5 to 20 parts of alkali metal hydroxide.

8. The method of claim 7 wherein the combination further comprises at least one of a rinse aid, bleaching agent, anti-microbial agent, bleaching agent activator; detergent builder or filler; defoaming agent, anti-redeposition agent, optical brightener, dye, or fragrance or any combination thereof.

9. The method of claim 7 wherein said combining step is accomplished in an extruder.

10. The method of claim 9 wherein the combination is poured into a mold before being allowed to solidify and the formed solid is removed from the mold before carbon dioxide treatment.

11. A method of determining the quality of the carbonate coating, comprising:

providing a carbonate-coated solid prepared by providing carbon dioxide to an alkali metal hydroxide-containing solid and allowing the alkali metal hydroxide and carbon dioxide to react thereby forming a carbonate-containing layer on the exterior of the solid wherein the carbonate-containing layer is non-hygroscopic and water soluble, and wherein greater than 80% of the hydroxide in the hydroxide-containing solid does not react with the carbon dioxide, and further wherein the alkali metal hydroxide-containing solid is substantially free of lithium hydroxide;

exposing the carbonate-coated solid to 95 weight percent ethanol;

collecting the ethanol exposed to the carbonate-coated solid and testing for alkali metal hydroxide concentration.

* * * * *